United States Patent [19]

Reesor et al.

[11] Patent Number: 4,796,287

[45] Date of Patent: Jan. 3, 1989

[54] DIGITAL LOUDSPEAKING TELEPHONE

[75] Inventors: Gordon J. Reesor; Gerald Kuhn, both of Nepean, Canada

[73] Assignee: Mitel Corp., Ontario, Canada

[21] Appl. No.: 781,020

[22] Filed: Sep. 27, 1985

[30] Foreign Application Priority Data

May 10, 1985 [CA] Canada .................................. 481289

[51] Int. Cl.$^4$ .......................................... H04M 1/60
[52] U.S. Cl. .................................... 379/390; 379/388
[58] Field of Search .............. 179/81 B, 100 L, 170.2, 179/170.6, 2 EA; 379/387.58, 388.61, 389, 390, 406, 407, 409

[56] References Cited

U.S. PATENT DOCUMENTS

| | | | |
|---|---|---|---|
| 3,823,275 | 7/1974 | La Marche et al. | 379/406 |
| 3,970,786 | 7/1976 | Randmere | 379/389 |
| 4,028,496 | 6/1977 | LeMarche et al. | 379/406 X |
| 4,029,912 | 6/1977 | Geigel et al. | 379/406 |
| 4,400,584 | 8/1983 | Vilmur | 379/61 |
| 4,465,902 | 8/1984 | Zato | 379/61 |
| 4,493,950 | 1/1985 | Lott | 379/388 |
| 4,496,799 | 1/1985 | Kingen et al. | 379/351 |
| 4,513,177 | 4/1985 | Nishino et al. | 379/389 |
| 4,560,840 | 12/1985 | Hansen | 379/389 |
| 4,571,461 | 2/1986 | Uno et al. | 379/390 |
| 4,628,156 | 12/1986 | Irvin | 379/410 |
| 4,644,108 | 2/1987 | Crouse et al. | 379/406 |
| 4,715,063 | 12/1987 | Haddad et al. | 379/390 |

Primary Examiner—Jin F. Ng
Assistant Examiner—Randall S. Vaas
Attorney, Agent, or Firm—Antonelli, Terry & Wands

[57] ABSTRACT

A digital loudspeaking telephone for connection to a telephone line, including a microphone, speaker, codec and digital signal processor. Incoming and outgoing signals are received by the digital signal processor from remote and local subscribers via the telephone line and microphone respectively. The processor generates and compares incoming and outgoing envelope and noise floor signal levels derived from the received incoming and outgoing signals and in response suppresses a particular compared, and one of the incoming or outgoing signals. Automatic gain control of outgoing signals is implemented in order to allow smooth switching of the outgoing signals and to suppress background noise from being transmitted by the microphone. Room echo and reverberation are also detected, and the processor eliminates spurious channel switching due to the detected echo signals.

6 Claims, 6 Drawing Sheets

DIGITAL LOUDSPEAKING TELEPHONE

This invention relates to telephone systems in general, and in particular to a digital loudspeaking telephone for use in conjunction with a digital PABX.

A loudspeaking telephone enables a local telephone subscriber to listen and speak to a remote party without holding a handset to his ear. The loudspeaking telephone incorporates a microphone for receiving voice signals from the local subscriber, and a loudspeaker for reproducing voice signals received from the remote party via a telephone line. Thus, a normal conversation can be carried on between the two parties while the subscriber's hands are otherwise occupied.

A common problem in many prior art loudspeaking telephones is feedback. Simultaneous use of the speaker and microphone can result in a positive feedback path being established between the speaker and microphone and having a closed loop gain of greater than one, resulting in an unstable system.

One type of prior art analog loudspeaking telephone utilizes voice operated switching for enabling one of the microphone or speaker in response to detection and comparison of the relative amplitudes of signals carried by microphone and speaker channels, respectively. The other one of the microphone or speaker is disabled so as to eliminate or "break" the feedback path and thereby ensure system stability.

A disadvantage of the aforementioned prior art loudspeaking telephone is that, in the event the remote subscriber is talking, the local loudspeaking telephone typically switches into speaker mode (i.e., the microphone is disabled). Hence, the remote party is given the impression that the line has gone "dead", which has been determined to be an undesirable effect.

A second type of prior art loudspeaking telephone is described in Canadian patent application Ser. No. 403,582 of MITEL CORPORATION, filed on May 21, 1982, and utilizes automatic gain control circuitry in order to attenuate signals on microphone and speaker channels in response to the relative amplitudes of the signals.

In both prior art loudspeaking telephones, voice signals received from the remote party are compared with a predetermined threshold value and transmitted through the speaker in the event they are greater than the threshold value. However, voice signals are typically attenuated during transmission over long distance trunks. Consequently the predetermined threshold value is typically made quite small in order that the speaker will be enabled in response to detection of received voice signals of relatively low amplitude. As a result, noise carried by the long distance trunks, resulting from dialling, cross talk etc., which are typically of greater amplitude than the threshold value, can result in inadvertent spurious channel switching.

Outgoing signals received by microphones of the prior art loudspeaking telephones are transmitted to the remote party in the event their amplitudes are greater than a further threshold value. Because the acoustical environment in which a loudspeaking telephone is utilized can vary from one location to another (for instance a noisy factory floor or a quiet office), the aforementioned further threshold value is required to be adjusted in order that noise signals from the acoustical evironment do not cause the microphone to switch on, resulting in the noise signals being transmitted to the remote party. Also, temperature drift of circuit components with time can result in variations in the threshold levels, requiring adjustment which typically requires the services of a trained qualified technician.

A further disadvantage of prior art analog loudspeaking telephones is that voice signals from the remote party, which are amplified and broadcast through the speaker, occasionally bounce off walls or other acoustic reflectors in the local subscriber's acoustical environment. These echo signals are received by the microphone and may be erroneously detected as being originating signals from the local subscriber, causing the microphone to switch on and the speaker to switch off, and thereby preventing subsequent reception of voice signals from the remote party.

Also, in the event incoming voice signals received from the line and outgoing signals received by the microphone are of approximately equal amplitude, spurious unstable switching can occur between the microphone and speaker channels of the prior art loudspeaking telephones.

Another prior art loudspeaking telephone utilizes separate microphone and speaker housings in an attempt to overcome the problems associated with voice operated switching. The separation between the microphone and speaker effectively reduces the loop gain to less than unity, thereby rendering the system stable. Although a more normal type of conversation can be carried on with this apparatus, the two housings and accompanying wires result in increased complexity and cost. Furthermore, the local subscriber often attempts to speak directly at the loudspeaker rather than into the microphone, thus reducing the amplitude and clarity of the signal transmitted to the remote party.

The present invention uses voice operated digital switching to ensure that only one of the microphone or speaker is operational at a given time, thus eliminating the feedback path. Hence, the microphone and speaker can be disposed in a single housing, thereby overcoming the disadvantages of the latter mentioned prior art loudspeaking telephone.

In the present invention, digital envelope representations of outgoing and incoming voice signals are generated in response to receiving outgoing and incoming voice signals from the microphone and the telephone line respectively. Digital representations of the background noise present in the acoustical environment of the local subscriber and on the telephone line are also generated and compared with the generated voice signal envelope representations in order to distinguish actual speech energy from noise present in the microphone and speaker channels respectively, (i.e., the "effective" speech envelope signal is detected).

According to the present invention, the background noise is continuously monitored in order that changes in the level thereof are automatically compensated for. Thus, the digital loudspeaking telephone of the present invention is self-adaptive, such that switching occurs in response to detection of "actual speech" or voice signals, regardless of background noise.

Hence, the present invention overcomes the disadvantage of the first mentioned prior art loudspeaking telephone wherein a further threshold level is required to be adjusted by a qualified technician in order that the loudspeaking telephone can function properly in a particular local acoustical environment, such as a factory or office.

The attack time of the generated speech envelope is made less than the decay time. Hence, in the event the local subscriber pauses temporarily between spoken words, and low amplitude noise signals are present on the line, the microphone channel of the local subscriber maintains control since the amplitude of the local subscriber's generated speech envelope decays slowly to an amplitude less than the amplitude of the noise signals on the line. Thus, the prior art disadvantage of spurious channel switching is overcome.

Also, the present invention implements an automatic gain control function with respect to signals on the microphone channel, for suppressing background noise from the local acoustical environment. For example, in the event the local subscriber pauses while speaking, background noise is initially transmitted to the remote party but is gradually attenuated such that the remote party does not get the impression that the line has suddenly gone dead due to abrupt channel switching. The gain control function is implemented with a quick attack and slow decay, such that the beginnings of words are not truncated in the event the local subscriber continues speaking. Hence, the attenuation of room noise is gradual as a result of the slow decay time period.

The present invention also comprises circuitry for estimating the expected echo or return loss level and generating a signal indicative thereof. The effective speech envelope signal is compared with the expected echo or return loss signal level, and erroneous channel switching due to reception of echo signals is thereby prevented.

The digital loudspeaking telephone of the present invention directly processes PCM bytes. Thus, advantage can be taken of the special features offered by present day digital PABXs. For instance, a digital signal processor portion of the present invention can be multiplexed among a plurality of subscribers' loudspeaking telephone sets and line or trunk circuits. Hence, the digital signal processor can be disposed on a main control board of the PABX, and accordingly each of the subscribers' loudspeaking telephones can be simply comprised of a microphone, speaker and codec for converting the PCM bytes to analog signals, and vice versa. Considerable cost and space savings are enjoyed over the prior art loudspeaking telephones as a result of multiplexing the digital signal processor.

In general, the invention is a loudspeaking telephone for connection to incoming and outgoing unidirectional data lines carrying digital representations of incoming and outgoing analog signals respectively, comprising a microphone for transmitting the outgoing analog signal, a speaker for receiving the incoming analog signal, a codec connected to the microphone and speaker, for receiving the outgoing analog signal and generating the digital representation of the outgoing analog signal in response thereto, and for receiving the digital representation of the incoming analog signal and generating the incoming analog signal in response thereto, a digital signal processor, including circuitry for receiving current incoming and outgoing signal samples of the incoming and outgoing signals from the data lines, and generating incoming and outgoing envelope signal samples and incoming and outgoing noise floor signal samples in response thereto, circuitry for detecting which of a previous one of the incoming or outgoing signals has been suppressed relative to the other, and further circuitry for comparing one of the incoming or outgoing noise floor samples to a corresponding one of the incoming or outgoing envelope signal samples in event the other one of the previous incoming or outgoing signals was suppressed, and suppressing the other one of the current incoming or outgoing signal samples in the event the corresponding envelope signal sample is greater than the corresponding noise floor signal sample.

More particularly, the invention is a digital loudspeaking telephone for connection to incoming and outgoing unidirectional data lines carrying digital representations of incoming and outgoing analog signals respectively, comprising a microphone for transmitting the outgoing analog signal, a speaker for receiving the incoming analog signal, a codec connected to the microphone and speaker for receiving the outgoing analog signal and generating the digital representation of the outgoing analog signal in response thereto, and for receiving the digital representation of the incoming analog signal and generating the incoming analog signal in response thereto. The invention is further comprised of a digital signal processor connected to the incoming and outgoing data lines and the codec, for: (1) storing one or more predetermined threshold signals (2) receiving the incoming and outgoing digital signal representations and generating incoming and outgoing digital envelope signal representations and incoming and outgoing digital noise floor signal representations respectively, in response thereto, (3) comparing a predetermined one of the incoming or outgoing digital envelope signal representations with a corresponding one of the incoming or outgoing noise floor signal representations, and (4) suppressing the other one of the incoming or outgoing digital signal representations in the event the aforementioned one of the incoming or outgoing digital envelope signal representations is greater than the corresponding one of the incoming or outgoing noise floor signal representations, or (5) summing a predetermined one of the threshold signals with the other one of the incoming or outgoing noise floor signal representations in the event the aforementioned one of the signal representations is less than the corresponding one of the noise floor signal representations and generating a sum signal in response thereto, and comparing the other one of the incoming or outgoing envelope signal representations with the sum signal and suppressing the other one of the digital signal representations in the event the other one of the envelope signal representations is less than the sum signal, and suppressing the aforementioned one of the digital signal representations in the event the other one of the envelope signal representations is greater than the sum signal.

The invention is also a method of suppressing one of an incoming or outgoing digital signal on incoming and outgoing data lines of a loudspeaking telephone, comprising the steps of receiving current incoming and outgoing signal samples of the incoming and outgoing signals from the data lines, and generating incoming and outgoing envelope signal samples and incoming and outgoing noise floor signal samples in response thereto, detecting which of a previous one of the incoming or outgoing signals has been suppressed relative to the other, and comparing one of the incoming or outgoing noise floor samples to a corresponding one of the incoming or outgoing envelope signal samples in the event the other one of the previous incoming or outgoing signal samples was suppressed, and suppressing the other one of the current incoming or outgoing signal samples in event the corresponding one of the envelope signal sample is greater than the corresponding noise floor signal sample.

For the purposes of describing operation of the present invention, reference will be made below to microphone or speaker channels as being "in control", by which is meant one of the microphone or speaker of the loudspeaking telephone is enabled, and the other one of the microphone or speaker is disabled.

A better understanding of the invention will be obtained by reference to the detailed description below, in conjunction with the following drawings, in which:

FIG. 6 is a flowchart of the operation of the circuits according to the drawings.

Figure 1A:
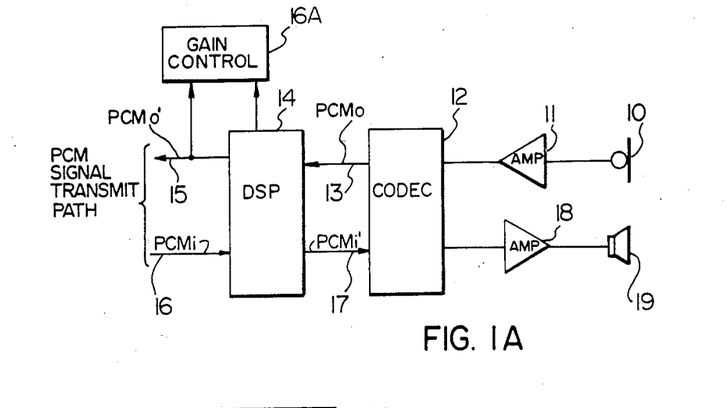
FIG. 1A is a system block diagram of the invention in its broadest form.

Turning now to FIG. 1A, illustrating a system block diagram of the invention, a microphone 10 is connected to an amplifier 11 for amplifying an outgoing analog signal. Amplifier 11 is connected to an analog input of a codec 12 for converting the outgoing analog signal into a pulse code modulated (PCM) signal representation thereof. The outgoing PCM signal $PCM_o$, is applied to unidirectional data line 13 and therefrom to digital signal processor 14 for processing the signal in order to effect the required channel switching, echo cancellation, etc., described below with reference to FIG. 2. The processed outgoing signal $PCM_o'$, is then applied to a unidirectional data line 15 on a PCM signal transmission path.

A gain control circuit 16A is connected to the data line 15 and to the digital signal processor 14 for effecting the aforementioned microphone channel gain control. In operation, gain control circuit 16A receives the processed digital outgoing signal $PCM_o'$ and a predetermined control signal from the digital signal processor 14, and performs gain adjustment of the signal by conversion to 13 bit linear code and subsequent shifting operations, described in greater detail below with reference to FIG. 5. The gain adjusted signal $PCM_o'$ is reapplied to data line 15 for further transmission.

An incoming digital signal $PCM_i$, from a unidirectional data line 16, is received by digital signal processor 14, applied to the incoming channel thereof and processed therein as described below with reference to FIG. 2. The resulting processed incoming digital signal $PCM_i'$, is then applied to codec 12 via a unidirectional data line 17. Codec 12 generates an incoming analog signal representation of the incoming digital signal $PCM_i'$, and applies it to an amplifier 18 for amplification and broadcast through speaker 19.

Digital signal processor 14 detects which one of the incoming or outgoing PCM channels was in control on the previous sample, and whether amplitude parameters of generated envelope signal samples of the current samples of $PCM_i$ or $PCM_o$ are greater than respective noise floor signal samples, echo signal samples and predetermined threshold signal samples, and causes switching of the microphone and speaker channels in response thereto.

In addition, digital signal processor 14 may be used to generate programmable tones such as ringing and busy tones which are transmitted to speaker 19, as described in further detail below, with reference to FIGS. 3 and 4.

Figures 1B, 1C, 1D:
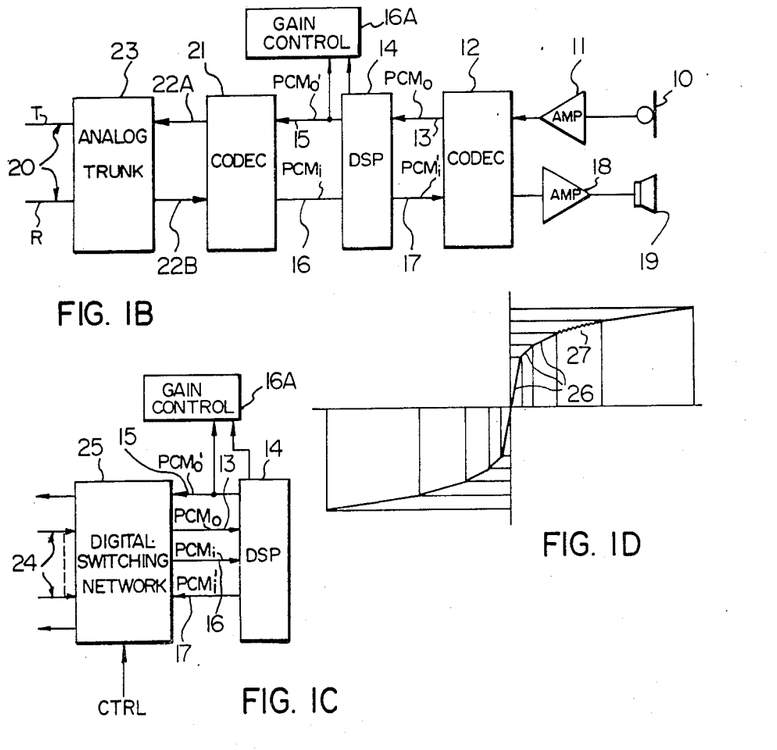
FIG. 1B is a system block diagram illustrating the invention connected to a bidirectional balanced telephone line.
FIG. 1C is a system block diagram illustrating a digital signal processor portion of the invention connected to a digital switching network.
FIG. 1D is a graph illustrating analog to digital signal conversion according to $\mu$-law code.

Turning now to FIG. 1B, illustrating the invention connected to a balanced 2-wire telephone line via tip and ring leads 20; digital signal processor 14 is connected via unidirectional data lines 15 and 16 to a second codec 21 which is connected via unbalanced output and input leads 22A and 22B respectively, to an analog trunk circuit 23 for connection to the tip and ring leads T and R, 20.

An outgoing signal from the microphone 10 is converted to a digital signal $PCM_o$, in codec 12. The $PCM_o$ signal is applied to DSP 14 for performing the aforementioned channel switching, etc., and an outgoing signal $PCM_o'$, is generated in response thereto. The $PCM_o'$ signal is gain adjusted in gain control circuit 16A, reapplied to data line 15, converted into an outgoing analog signal in codec 21, and is transmitted to analog trunk circuit 23 for further transmission along the tip and ring leads 20, to a remote central office, etc.

An incoming signal on the tip and ring leads T and R, 20 is applied to analog trunk circuit 23. Trunk circuit 23 implements various impedance matching conversions and transmits the incoming signal to the unbalanced input lead 22B, in a well known manner. The incoming signal is then received from the lead 22B by codec 21 and converted therein to an incoming digital signal $PCM_i$, and subsequently applied to digital signal processor 14 for channel switching, etc. The processed incoming digital signal $PCM_i'$ is then transmitted to codec 12 for conversion to analog, and therefrom to the speaker 19.

Turning now to FIG. 1C, a plurality of unidirectional data lines 24 of the PCM signal transmission path, are shown connected to a digital switching network 25 for selecting PCM signals from two pairs of the unidirectional data lines. Each of the data lines 24 can be connected to further digital switching networks 25 or codecs 12 or 21. The digital switching network 25 is well known in the art, and effectively multiplexes the digital signal processor 14 between a plurality of local loudspeaking telephones and outside lines, as discussed above.

In operation, a first predetermined pair of unidirectional data lines is selected by digital switching network 25 in response to receiving a predetermined control signal CTRL from an external controller, such as a microprocessor, (not shown). Signals carried by the unidirectional data lines are applied to digital signal processor 14 in order to effect the aforementioned channel switching, etc. The selected data lines from the first pair are typically connected to unidirectional data lines such as lines 15 and 16 in FIG. 1A. The second pair of selected data lines are typically connected to unidirectional data lines 13 and 17. Processed signals $PCM_o'$ and $PCM_i'$ are received from DSP 14 and are applied to digital switching network 25 for connection to the second predetermined pair of unidirectional data lines 24.

Before proceeding further, reference will be made briefly to FIG. 1D, in order to describe the well known PCM μ-law encoding technique utilized in the present invention.

PCM signals are frequently compressed for transmission along the data lines, such as 15, 16, 13, 17 and 24, etc. In North America, digital compression is implemented according to what is commonly known in the art as μ-law code, while in Europe compression is effected according to A-law code. In μ-law code the most significant bit of a PCM signal sample is a sign bit, wherein a "1" indicates a positive amplitude and a "0" indicates a negative amplitude. With reference to the graph, in FIG. 1D, analog signal amplitudes are measured along the horizontal axis and PCM signal sample values are measured along the vertical axis. A first plurality of less significant bits represents a predetermined amplitude segment or chord of the signal. Three chords or segments are illustrated in FIG. 1D by the reference numeral 26. A second plurality of least significant bits represents a discrete amplitude step within the segment or chord. A series of discrete amplitude steps is illustrated by the reference numeral 27, in FIG. 1D. For example, an 8 bit μ-law code typically consists of a most significant sign bit, 3 bits indicative of the chord and 4 bits corresponding to a particular one of 16 amplitude steps within the predetermined chord. Analog signals are converted to μ-law PCM signals, and vice versa, in codec 12 shown in FIG. 1A, and codecs 12 and 21 in FIG. 1B, in a well known manner.

Figure 2:
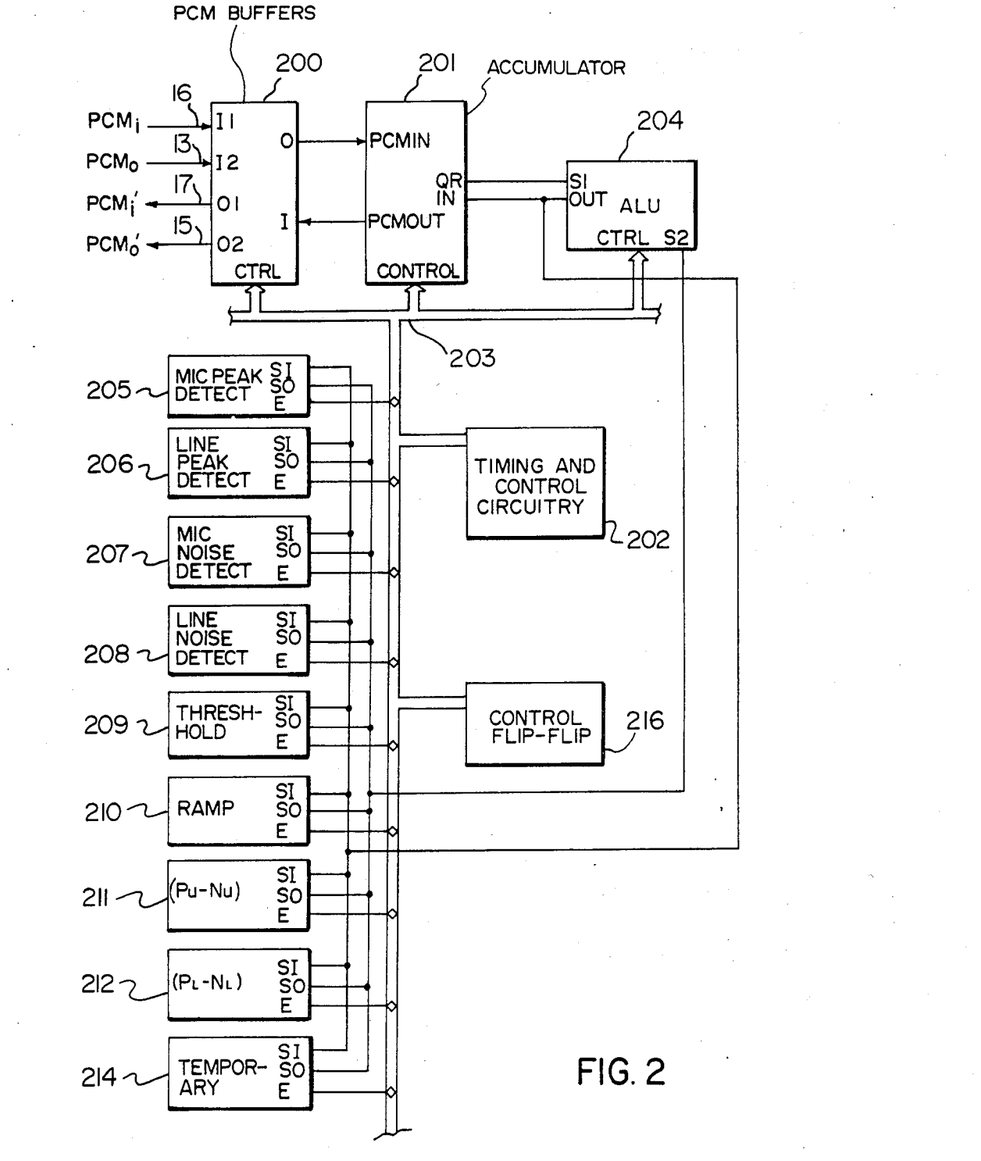
FIG. 2 is a detailed block diagram showing the principal features of the digital signal processor portion of the present invention.

Turning now to FIG. 2, a detailed block diagram is shown illustrating the digital signal processor 14 (FIGS. 1A, 1B and 1C) of the invention. Incoming and outgoing PCM signals, $PCM_i$ and $PCM_o$, are carried by unidirectional data lines 16 and 13 respectively, shown connected to PCM buffers 200. PCM buffers 200 are connected to the PCM IN and PCM OUT terminals of an accumulator 201. Processed incoming and outgoing PCM signals $PCM_i'$ and $PCM_o'$, are transmitted to unidirectional data lines 17 and 15, respectively. Data lines 16, 13, 17 and 15 correspond to the similarly numbered data lines illustrated in FIGS. 1A, 1B and 1C. Incoming and outgoing PCM signals $PCM_i$ and $PCM_o$, are received by accumulator 201 under control of timing and control circuitry 202 connected to control inputs CTRL of the accumulator 201 via a control bus 203. Output QR of accumulator 201 is connected to the S1 input of an arithmetic logic unit, ALU 204, described in further detail below.

Microphone envelope detect register 205 and line envelope detect register 206 are storage registers for temporarily storing digital sample values corresponding to the amplitude envelopes of signals on the microphone and speaker channels, respectively, as described in greater detail below.

Microphone noise detect register 207 and line noise detect register 208 are storage registers for storing digital sample values corresponding to the amplitude envelopes of noise signals carried by the microphone and line channels, respectively. Hence, the stored noise floor sample value represents the average ambient noise amplitude associated with a particular one of the microphone or speaker channels. For instance, signals received from the remote party tend to exhibit higher average ambient noise due to crosstalk and 60 Hz interference from high tension wires, etc., and signals received from the local subscriber exhibit noise signals due to ambient room noise.

Threshold register 209 stores the predetermined digital threshold values for comparison with the envelope signal sample values stored in registers 205 and 206. A series of operations (including the aforementioned comparison), are performed by ALU 204 on the digital threshold values and the digital values stored in registers 205, 206, 207 and 208, described in greater detail below. These operations ultimately result in microphone and speaker channel switching.

RAMP register 210 is a storage register for storing a value indicative of the expected room echo (when the speaker channel is in control) or the predicted return loss for the microphone (when the microphone is in control). The RAMP register 210 is utilized to prevent false channel switching due to echo signals or room reverberation, as described in further detail below.

Registers 211, 212 and 214 are storage registers for temporarily storing the results of predetermined ones of the aforementioned operations, described below in greater detail.

The output OUT, of ALU 204 is connected to the input IN, of accumulator 201 and to respective inputs SI, of registers 205 to 214. Serial outputs S0 of registers 205 to 214 are connected together and to the S2 input of ALU 204.

Timing and control circuitry 202 is connected to a plurality of control inputs of accumulator 201, PCM buffers 200 and ALU 204, and to enable inputs, $\overline{E}$, of registers 205 to 214 via control bus 203.

Control flip-flop 216 is a one bit memory for storing a digital signal indicative of one of the line or microphone channels having been previously in control during processing of the previous PCM signal sample.

Modern day digital PABXs typically employ a time slot scheme for transmitting and receiving PCM signals. According to the preferred embodiment as designed for use with the Mitel ST-BUS* scheme, a "frame" of digital signals typically consists of 32 8-bit PCM "time slots". Incoming and outgoing signal samples ($PCM_i$ and $PCM_o$) are typically transmitted during predetermined ones of the 32 time slots.

* ST-BUS is a registered trademark of Mitel Corp.

While reference was made above to $PCM_i$, $PCM_i'$, $PCM_o$ and $PCM_o'$ as representing signals comprised of sequences of PCM samples, reference to these terms in the following description is meant to designate individual samples of the PCM signals.

In operation, with reference to FIG. 2 and the flowchart in FIG. 6, a microphone signal sample $PCM_o$, transmitted during a predetermined time slot of first frame (denoted as the odd frame), is received from the local subscriber's microphone via data line 13, stored in PCM buffers 200, and subsequently loaded into accumulator 210 under control of timing and control circuitry 202, pursuant to step 1A of the flowchart.

The received microphone signal sample $PCM_o$ is in μ-law code representation, as described above. In linear core, a "1" in the most significant bit of a sample indicates a negative value. While full conversion of PCM signal samples to linear code is unnecessary in order to perform arithmetic operations thereon, the most significant bit (i.e., the sign bit) thereof is reset to "0" in order to perform 2's compliment arithmetic in ALU 204. Pursuant to step 1 of the flowchart, the signal sample $PCM_o$ is rectified in accumulator 201 by clearing the sign bit under control of timing and control circuitry 202.

Microphone peak detect register 205 contains a digital sample value representing the instantaneous amplitude of the envelope of the signal on the microphone channel during the previous sample, denoted as $P_u(n-1)$.

The rectified microphone signal sample, denoted as $RECT_u(n)$, is applied to input S1 of ALU 204. $P_u(n-1)$, is applied from register 205 to input S2 of ALU 204, under control of timing and control circuitry 202. $P_u(n-1)$ is subtracted from $RECT_u(n)$ in ALU 204, by means of a 2's compliment addition. The result of the subtraction $RECT_u(n)$-$P_u(n-1)$ is applied to the input IN of accumulator 201. In the event the result of the subtraction is negative, indicated by a logic "1" in the most significant bit, the microphone signal amplitude is decaying and the result ($RECT_u(n)$-$P_u(n-1)$) is then shifted to the right by 8 bits in accumulator 201 under control of timing and control circuitry 202. Shifting the result to the right by 8 bits corresponds to an amplitude division by 256. In the event the subtraction in ALU 204 yields a "0" in the most significant bit, indicating a rising microphone signal amplitude, the result ($RECT_u(n)$-$P_u(n-1)$), is shifted to the right by 5 bits in accumulator 201 (corresponding to division by 32).

The shifted result is then applied to the S1 input of ALU 204 and added therein to the previous envelope sample value $P_u(n-1)$. The result of this addition is stored in register 205.

The resulting sum in register 205 is the current sample value of the microphone envelope signal, $P_u(n)$ and can be represented by the formula:

$$P_u(n)=P_u(n-1)+[RECT_u(n)-P_u(n-1)]/32,$$

in the event the microphone signal amplitude is rising, or $$P_u(n)=P_u(n-1)+[RECT_u(n)-P_u(n-1)]/256,$$

in the event the outgoing signal amplitude is decaying.

The envelope signal generated from successive sample values of $P_u(n)$, approximately tracks the envelope of the microphone signal, and has moderate attack and slow decay times.

Pursuant to step 2 of the flowchart, the current microphone envelope sample value $P_u(n)$, is shifted into accumulator 201. The previous microphone noise floor sample value stored in register 207, $N_u(n-1)$, is subtracted from $P_u(n)$ in ALU 204. In the event the result of this subtraction is positive, $N_u(n-1)$ is incremented by one in ALU 204, thereby forming the current microphone noise floor sample value $N_u(n)$ which is subsequently applied to microphone noise detect register 207. In the event the result of the aforementioned subtraction is negative, the previous noise floor value is decremented by eight in ALU 204.

By incrementing the noise floor value by one and decrementing by eight in response to the result of the aforementioned subtraction, the noise detect registers 207 and 208 function essentially as negative peak detectors for envelope detect registers 205 and 206 respectively, (i.e., registers 207 and 208 exhibit long attacks and short decays).

With reference to step 3 of the flowchart, a current sample of the incoming (or line) signal $PCM_l$ is loaded into PCM buffers 200 and applied therefrom to accumulator 201. Signal sample $PCM_l$ is rectified in accumulator 201, as described above with reference to the microphone channel, resulting in the current rectified line signal sample denoted as $RECT_L(n)$. A previous sample value of the line envelope signal $P_L(n-1)$, stored in line envelope detect register 206, is subtracted from $RECT_L(n)$ in ALU 204, and shifted either 5 or 8 bits to the right under control of timing and control circuitry 202 as described above, with respect to step 1. The result is added to $P_L(n-1)$ and stored in line envelope detect register 206.

The current sample value of the line envelope signal $P_L(n)$ can be represented by the formula:

$$P_L(n)=P_L(n-1)+[RECT_L(n)-P_L(n-1)]/32,$$

in the event the incoming signal amplitude is rising, or $$P_L(n)=P_L(n-1)+[RECT_L(n)-P_L(n-1)]/256,$$

in the event the incoming signal amplitude is decaying.

With reference to step 4 of the flowchart, the current line noise floor sample value, $N_L(n)$, is calculated and stored in line noise detect register 208 in a similar manner to the calculation of the microphone noise floor sample value, described above with reference to step 2 of the flowchart.

The noise floor values generated from successive samples of $N_u(n)$ and $N_L(n)$ represent the average ambient noise amplitudes on the microphone and line channels respectively, have long attack and decay times, and consequently do not react to spurious peak envelope signal sample values on the microphone or line channels.

With reference to step 5 of the flowchart, the contents of RAMP register 210 are loaded into ALU 204 and decremented therein. The decremented value of RAMP is then stored in RAMP register 210, as discussed in greater detail below.

Referring again to step 1A, timing and control circuitry 202 determines whether the current PCM frame is add or even. In the event the current frame is even step 6 is executed.

Operations described below, with reference to steps 6 to 14 of the flowchart, are performed on the current sample values stored in registers 205 to 214. Hence, the postscript "(n)" has been omitted from the flowchart and the following description.

Am indication of which of the microphone or line channels was most active on the previous sample, (i.e. which channel was in control), is stored in control flip-flop 216. In a successful prototype of the invention, a "0" stored in flip-flop 216 was indicative of the speaker channel having been previously in control and a "1" stored therein was indicative of the microphone channel having been in control on the previous sample.

The value of the bit stored in flip-flop 216 is detected under control of timing and control circuit 202 in order to determine which channel was in control on the previous sample, corresponding to step 6 of the flow chart in FIG. 6.

In the event the microphone channel was in control, with reference to step 7A of the flowchart, the microphone noise floor sample value $N_u$ stored in register 208 is subtracted in ALU 204 from the microphone envelope sample value $P_u$. The resulting effective microphone signal sample value is stored in register 211.

In the event the result of the subtraction in step 7A was positive, indicating that the local subscriber is still speaking, the microphone channel retains control and the result stored in register 211 is loaded into accumulator 201 and multiplied by 8 (i.e. shifted 3 bits to the left) therein. The value stored in RAMP register 210 is then subtracted from $8(P_u - N_u)$ in ALU 204 and the result is stored in register 214 pursuant to step 8A.

In the event the value stored in the RAMP register is less than $8(P_u - N_u)$, RAMP register 210 is loaded with the value $8(P_u - N_u)$. Hence, the value stored in the RAMP register 210 follows or "tracks" the peaks of the signals on the microphone channel. Considering step 5 again, the contents of RAMP register 210 are decremented every alternate frame, hence the value stored in RAMP register 210 decays slowly to zero when there is no speech on the microphone channel.

Pursuant to step 10, the value $(P_u - N_u)$ stored in register 211 is compared to a speech threshold value $T_u$. If the result of the comparison is positive, voice energy is deemed to be present on the microphone channel and timing and control circuitry 202 generates a predetermined control signal on bus 203, for storage in a gain control flip-flop described below with reference to FIG. 5, pursuant to step 11A.

In the event the outgoing signal was previously attenuated, the gain control circuit 16A (FIGS. 1A, B and C) increases the outgoing signal gain after 256 frames. In the event the comparison of step 10 yields a negative result, the gain of the outgoing signals on the microphone channel is caused to be decreased after 2,048 frames, according to step 11B. Four gain steps are employed in the preferred embodiment of the invention; $-18$ db, $-12$ db, $-6$ db and 0 db. The gain is adjusted by receiving the microphone sample value $PCM_0'$ from accumulator 201, converting to linear code, shifting a predetermined number of bits to the right, and reconverting to $\mu$-law code within gain control circuit 16A, and subsequently restoring the shifted sample value in accumulator 201, as discussed below with respect to FIG. 5.

Pursuant to step 12A, speaker 19 is turned off by transmitting "quiet code" to the PCM buffers 200. Quiet code is comprised of a sequence of PCM signal samples each of which consists of a plurality of logic low signals, (i.e. binary zeroes). The generation of quiet code is discussed in greater detail below with reference to FIGS. 3 and 4.

In the event the result of the subtraction in step 7A is negative, (i.e., there is no voice energy on the microphone channel), the speaker channel is given a opportunity to regain control. Firstly, the contents of register 208 are subtracted from the value $P_L$ stored in register 206. The result $(P_L - N_L)$ is then stored in register 212. Then, the signal stored in RAMP register 210 is subtracted from $(P_L - N_L)$ to remove all traces of microphone return loss signal from the values stored in line peak detect register 206. The result of this subtraction is then compared to the threshold value $TH_L$. If the result is negative, then control is not switched to the speaker channel and the speaker is once again turned off, in step 12A. If however, the result of the subtraction in step 13A is positive, then control is transferred to the speaker channel by setting the bit stored in control flip-flop 216 to a "0", in step 14A. Hence, when the program recycles and returns to step 6, the "0" stored in control flip-flop 216 indicates that the speaker channel is in control.

Next, the value stored in register 212, $(P_L - N_L)$, is multiplied by 16 (ie. shifted 4 bits to the left in accumulator 201), stored in register 214, and compared in step 8B with the contents of RAMP register 210. If the result of this comparison is negative, the microphone is turned off in step 12B, by generating and transmitting quiet tone to the remote party. If however the result of the comparison is positive, RAMP register 210 is loaded with the value $16(P_L - N_L)$ stored in register 214.

The value $16(P_L - N_L)$ is an estimate of the predicted room echo signal amplitude. The signal gain between speaker 19 and microphone 10 including amplifiers 11 and 18 (FIGS. 1A, 1B) is typically 20 db (hence the multiplication by 16). If the predicted signal amplitude is larger than the value stored in RAMP register 210, then RAMP register 210 is set to be equal to $16(P_L - N_L)$. RAMP register 210 is continually updated in this way and decremented pursuant to step 5 such that channel switching due to echo signals is virtually eliminated.

With reference to step 12B, the microphone is effectively switched off by transmitting quiet code to the PCM buffers 200, so as to ensure that signals emanating from the speaker are not transmitted to the remote subscriber via the microphone.

Steps 7B, 13B and 14B correspond to steps 7A, 13A and 14A referred to above. Hence, the steps executed pursuant to the speaker channel being in control correspond to the steps referred to above with respect to the microphone channel being in control, with the exception that due to the large (20 db) gain between the speaker 19 and microphone 10, the multiplication factor 16 is used as opposed to 8 for the microphone channel such that sufficient cancellation of reverberation is achieved. Also, microphone gain control is not implemented when the speaker channel is in control. As discussed above, microphone gain control substantially eliminates the transmission of noise from the local subscriber using a loudspeaking telephone, to a remote party, and consequently is unnecessary when the speaker channel is in control.

In the event that the remote party stops speaking, and his last spoken words reflect off a wall or other reflector in the acoustical environment of the local subscriber's loudspeaking telephone, causing echo signals, the microphone 10 receives these echo signals and applies them to PCM buffers 200 during subsequent samples. Since the RAMP register 210 follows the signal peaks on the speaker channel, the value stored in RAMP register 210 will be large. Because the remote party has stopped speaking, $P_L$ is a small value and the subtraction in step 7B yields a negative result. In step 13B, the microphone echo signal stored in RAMP register 210 is subtracted from the value $(P_u - N_u)$ stored in register 211. The result of this subtraction is then compared to a threshold value $TH_u$, stored in register 209.

Because the value stored in RAMP register 210 is large, as described above, the result of the subtraction in step 13B will be negative. A negative result in the subtraction in step 13B indicates that the line channel is to retain control. In other words, if the remote party pauses while speaking, echo signals picked up by the microphone 10 at the subscriber's loudspeaking telephone will not be large enough to cause the microphone channel to regain control.

In the event that both parties remain silent after the echo signals have diminished, $P_L$ remains low and subsequent subtractions pursuant to steps 7B and 13B yield negative results. The line channel therefore retains control. However, the value stored in RAMP register 210 is decremented with every received negative PCM frame (step 5) and gradually returns to zero. The line channel retains control until such time as the effective microphone signal amplitude ($P_u - N_u$) stored in register 211, is greater than the sum of the values provided by $TH_u$ and RAMP. Threshold value $TH_u$ establishes a threshold level below which control will not inadvertently switch as result of reception of low amplitude signals on the microphone channel, (e.g. background spurious noise etc.).

By the same principle, if both the local subscriber and the remote party begin talking simultaneously ad equally loudly, the channel which was previously in control will retain control.

If, however, the local subscriber begins talking while the remote party has paused, the current sample of $P_u$ becomes greater than the sum of $N_u$ and threshold value $TH_u$, (the value RAMP is decremented to approximately zero after approximately 100 msec.). As a result, the subtraction in step 13B yields a positive result, and control flip-flop 216 is loaded with a "1" in step 14B (i.e. the microphone channel takes control). The value ($P_u - N_u$) stored in register 207, is multiplied by eight and the result is stored in register 211. RAMP register 210 is loaded with the binary value $8(P_u - N_u)$ stored in register 214 in the event the RAMP value is less than $8(P_u - N_u)$, pursuant to execution of steps 8A and 9A. The microphone gain control is adjusted in steps 10, 11A and 11B and the speaker 19 is turned off (step 12A).

In summary, the digital signal processor portion of the loudspeaking telephone detects which of the line or microphone channels was previously in control, yet provides an opportunity for the other channel to regain control by comparing incoming and outgoing envelope signal sample values with corresponding predetermined threshold and echo values. The line channel signal samples are suppressed in the event the local subscriber is talking, and the microphone channel gain is adjusted in response to signals thereon. Similarly, the microphone signal samples are suppressed in the event the remote party is talking. The digital signal processor guards firstly against remote and local loudspeaking telephones being simultaneously switched into their microphone modes, and secondly against spurious channel switching due to echo signals or in the event neither party is talking or both parties are talking equally loudly.

The present invention also compensates for noise generated on the incoming and outgoing channels due to crosstalk, etc. by detecting average noise floor signal sample values associated with the channels and subtracting them from voice signals carried by the channels.

Figure 3:
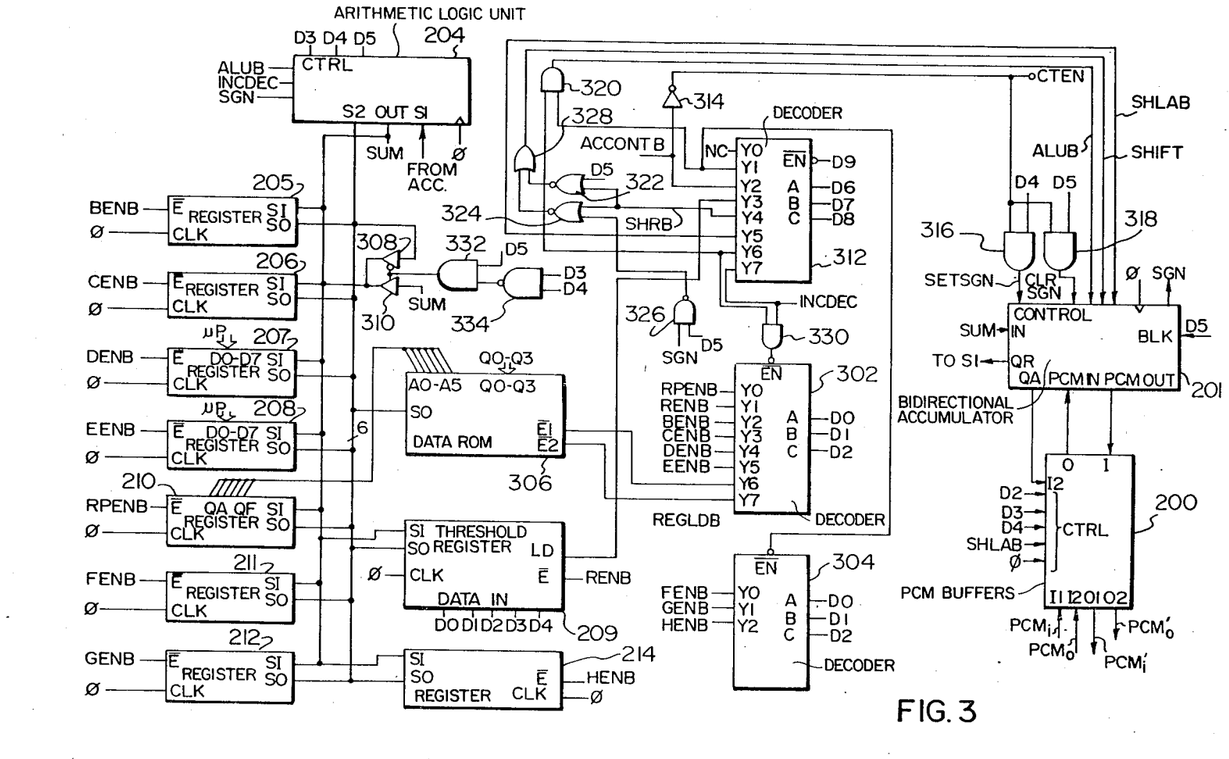
FIG. 3 is a schematic diagram of data storage and manipulation circuitry of a preferred embodiment of the digital signal processor portion of the invention.
Figure 4:
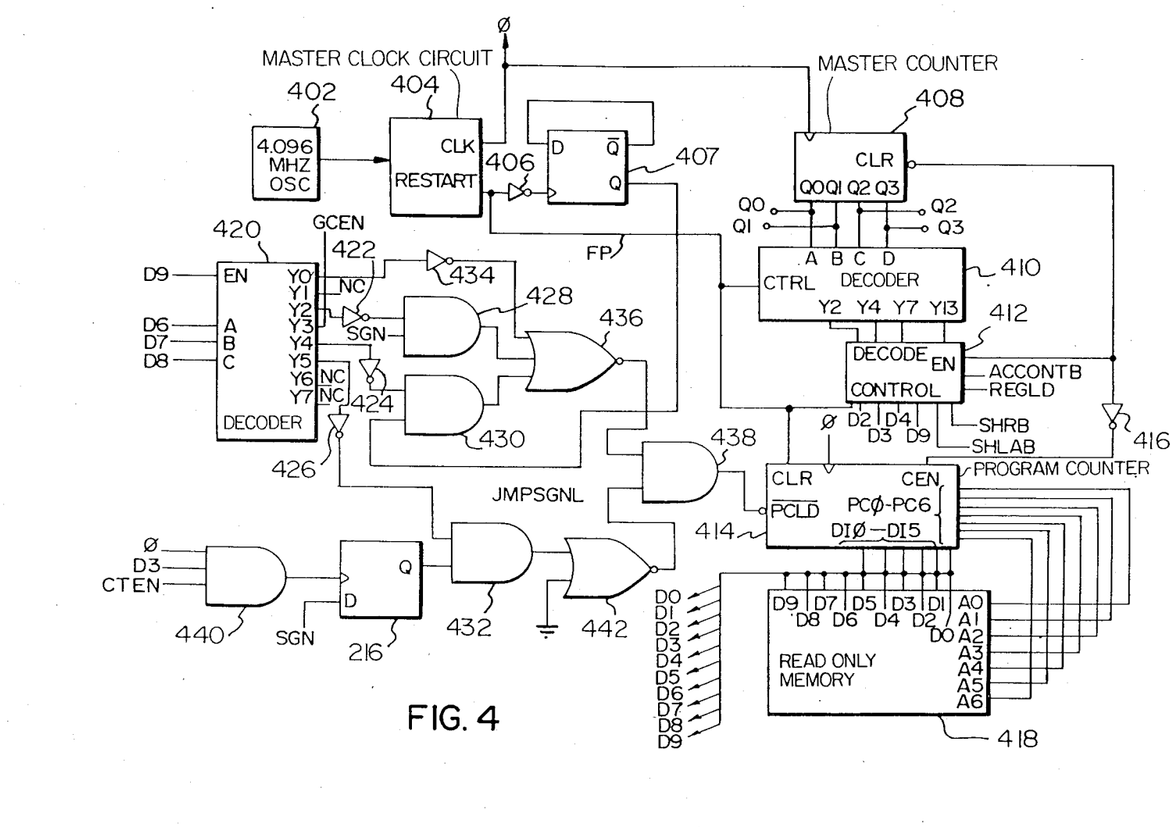
FIG. 4 is a schematic diagram of timing and control circuitry of the preferred embodiment of the digital signal processor portion of the invention.

FIGS. 3 and 4 are schematic diagrams of data storage and manipulation, and timing and control circuitry according to a preferred embodiment of the digital signal processor 14 of the invention.

With reference to FIG. 3, incoming and outgoing 8 bit PCM signal samples $PCM_i$ and $PCM_o$ are loaded serially into PCM buffers 200 on a positive transition of a system clock signal $\phi$, in response to execution of a SHIFT LEFT instruction generated by an instruction ROM 418 (FIG. 4), discussed in greater detail below.

PCM buffers 200 are connected to PCM IN and PCM OUT terminals of bidirectional accumulator 201. Accumulator 201 is connected to the S1 input of arithmetic logic unit ALU 204. Storage registers 205-214 are connected to the S2 input of ALU 204 as described with reference to FIG. 2. Enable inputs $\overline{E}$, of registers 205-214 are connected to respective outputs YO-Y5 and YO-Y2 of three-to-eight decoders 307 and 304 respectively. In a successful prototype of the invention, accumulator 201 and registers 205-214 each had 14 bit capacity.

Registers 205-214 can be any of a variety of stOrage registers such as random access memories. However, in the preferred embodiment, registers 205-214 are shift registers.

A QA output of accumulator 201 is connected to an I2 input of PCM buffers 200. The QA output transmits the least significant 8 bits of a 14 bit value stored therein to PCM buffers 200, which typically store 8 bit signals.

Noise detect registers 207 and 208 are parallel loadable from a microprocessor, $\mu P$, not shown, for performing DTMF tone generation, as described below. Threshold register 209 is parallel loadable for storing threshold values $TH_u$, $TH_2$ and $T_u$, discussed above. Parallel outputs Q0-QF, of RAMP register 210 are used to address a DATA ROM 306.

Signals appearing on the serial outputs S0, of registers 205-214 can be selectively fed back to respective inputs SI thereof through gates 308 and 310, under control of data bits D3, D4 and D5.

Before describing operation of the circuitry illustrated in FIG. 3, reference will be made to FIG. 4, illustrating the timing and control circuitry 202, discussed with reference to FIG. 2.

A high frequency oscillator 402 generates an approximately 4.096 MHz signal to a master clock circuit 404. In response to reception of the high frequency signal, master clock circuit 404 generates the aforementioned clock signal $\phi$ from a CLK output thereof. In addition, master clock circuit 404 generates a frame pulse signal FP from the RESTART output thereof, which is applied to frame counter flip-flop 406 via an inverter 407.

The $\overline{Q}$ output of flip-flop 406 is connected to the D input thereof, such that the flip-flop functions as a toggle in response to receiving frame pulse signals FP from master clock circuit 404. The Q output of flip-flop 406 is connected to jump control circuitry, described in further detail below.

Outputs Q0, Q1, Q2 and Q3 of a master counter 408 are connected to the A, B, C and D inputs of a 4-to-16 decoder 410.

Outputs Y2, Y4, Y7 and Y13 of decoder 410 are connected to DECODE inputs of a reset circuit 412. Data bits D2, D3, D4 and D9, in addition to enable signals SHLAB, SHRB, REGLD and ACCONTB, are applied to CONTROL inputs of reset circuit 412. Predetermined combinations of signals on the CONTROL and DECODE inputs of reset circuit 412 cause generation of reset signals from an EN output thereof. The EN output is connected to a clear input CLR of master counter 408 and a count enable input CEN of a program counter 414 via an inverter 416. Also, the frame pulse signal FP generated by master clock 404 is applied to the CONTROL inputs of reset circuit 412.

Master counter 408 counts from 0 to 14 (decimal), after which the EN output of reset circuit 412 goes momentarily low, applying a reset signal to counter 408. Master counter 408 counts the number of cycles required for execution of an instruction stored in ROM 418. Instructions require varying lengths of time for their execution, ranging from between 1 to 14 clock cycles. For example, adding two binary samples through ALU 204 requires 14 cycles, and a jump instruction requires only 1 cycle. Each time the counter 408 is reset, program counter 414 is enabled for 1 clock cycle, and incremented by 1, thereby addressing the next location in ROM 418. The contents of the addressed location in ROM 418 are decoded in decoders 302, 304 and 312 (in FIG. 3), and 420, (shown in FIG. 4), in order to implement one of seven different types of instructions; JUMP, INCDEC, ARITHMETIC, SHIFT LEFT, SHIFT RIGHT, REGISTER LOAD and ACCUMULATOR CONTROL.

Various ones of the seven instruction types cause performance of the various operations described with respect to FIG. 2 and the flowchart.

Master counter 408 is also reset in response to SHLAB, SHRB or ACCONTB signals appearing on the CONTROL inputs of reset circuit 412. For example, master counter 408, and program counter 414 are reset upon receipt of the frame pulse signal FP from master clock 404. In a successful embodiment of the invention, the frame pulse signal occurs every 125 microseconds. The ARITHMETIC and INCDEC instructions typically require 14 clock cycles for execution, the SHIFT LEFT and SHIFT RIGHT instructions require from 1 to 8 clock cycles for execution, and the JUMP, ACCUMULATOR CONTROL and REGISTER LOAD instructions require only one cycle for execution.

Signals appearing on the most significant data outputs D6, D7, D8 and D9 of instruction ROM 418 are decoded in decoder 420 in order to provide a number of jump control signals. Conditional jump signals from outputs Y2, Y4 and Y5 thereof are inverted in inverters 422, 424 and 426 respectively and applied to first inputs of AND gates 428, 430 and 432, respectively. The SGN signal from accumulator 201 (FIG. 3) provides an indication of whether a value stored therein is positive or negative, (i.e., the SGN signal is the most significant bit of the value stored in accumulator 201). The SGN signal is applied to a second input of AND gate 428. A second input of AND gate 430 is connected to the Q output of flip-flop 407.

Output Y0 of decoder 420 is inverted in an inverter 434 to provide an unconditional jump signal, for application to a first input of a NOR gate 436. The output of inverter 434 and the outputs of AND gates 428 and 430 are connected to second and third inputs of NOR gate 436, the output of which is connected to a first input of an AND gate 438.

Clock signal θ, data bit D3 and an enable signal CTEN are applied to first, second and third inputs of an AND gate 440. The output of AND gate 440 is connected to a clock input of control flip-flop 216. The D input of flip-flop 216 is connected to the SGN output of accumulator 201. The Q output of flip-flop 216 is connected to a second input of AND gate 432. The output of AND gate 432 is connected to a first input of a NOR gate 442, and generates an enable signal denoted as JMPSGNL, for effecting a predetermined one of the JUMP instructions. A second input of NOR gate 442 is connected to ground, and the output thereof is connected to a second input of AND gate 438. The output of AND gate 438 is connected to a $\overline{PCLD}$ input of program counter 414.

When any of the outputs of AND gates 428, 430 and 432 or inverter 434 go high, the output of corresponding NOR gates 436 or 442 go low, causing the output of AND gate 438 to go low. As a result, program counter 414 is loaded with data bits D0 to D6, from ROM 418, which represent an interrupt address location in ROM 418. Hence, program control "jumps" to an interrupt address in response to predetermined signals being applied to AND gates 428, 443, 432 and inverter 434.

Output Y3 of decoder 420 generates a GCBN enable signal for application to the gain control circuitry 16A, discussed with reference to FIG. 1A, and in greater detail below with reference to FIG. 5.

Returning to FIG. 3, data bits D6, D7 and D8 are decoded in the previously mentioned three-to-eight decoder 312. Data bit D9 is connected to an enable input $\overline{EN}$, of decoder 312, such that one of decoders 312 and 420 (FIG. 4) is disabled when the other one of the decoders is enabled. Output Y1 of decoder 312 is connected to the enable input $\overline{EN}$ of decoder 304. Output Y2 of decoder 312 generates a signal ACCONTB, for effecting one or the aforemention ACCUMULATOR CONTROL instructions. The ACCONTB signal is inverted in an inverter 314 to provide the aforementioned control enable signal CTEN. The output of inverter 314 is connected to first inputs of AND gates 316 and 318. Second inputs of AND gates 316 and 318 are connected respectively to the D4 and D5 data outputs of instruction ROM 418 (FIG. 4). The output of AND gate 316 goes high, generating a SET SGN signal, in response to the Y2 output of decoder 312 going low and data output D4 of ROM 418 (FIG. 4) going high. The SET SGN signal causes the sign bit SGN of a value stored in accumulator 201 to be set equal to 1. Similarly, the output of AND gate 318 generates a CLR SGN signal for clearing the sign bit of a value stored in accumulator 201 in response to the Y2 output of decoder 312 being low and the D5 data output being high.

Decoder 304 is enabled in response to the Y1 output of decoder 312 going low. The Y1 output of decoder 312 is also connected to a first input of an AND gate 320. The second input of AND gate 320 is connected to the Y6 output of decoder 312. The output of AND gate 320 generates an ALUB enable signal for application to accumulator 201, and ALU 204, for implementing a predetermined one of the ARITHMETIC instructions.

The Y3 output of decoder 312 generates a REGLDB signal for effecting one of the aforementioned REGISTER LOAD instructions which is applied to a register load input LD of threshold register 209, for loading the threshold values $TH_u$, $TH_L$ and $T_u$.

The Y4 output of decoder 312 generates a SHRB signal for implementing one of the SHIFT RIGHT instructions, which is applied to first inputs of NOR gates 322 and 324. A second input of NOR gate 322 is connected to the D5 data output of instruction ROM 418 (FIG. 4). Data output D5 of instruction ROM 418 (FIG. 4) and the SGN output of accumulator 201 are applied to first and second inputs of a NAND gate 326, the output of which is connected to a second input of NOR gate 324. The outputs of NOR gates 322 and 324 are connected to first and second inputs of an OR gate 328. The output of OR gate 328 generates a SHIFT enable signal, which is applied to a CONTROL input of accumulator 201.

Output Y5 of decoder 312 generates a SHLAB enable signal, which is also applied to the control input of accumulator 201.

Output Y7 of decoder 312 generates an INCDEC enable signal, for incrementing or decrementing a value applied to ALU 204. The Y7 output of decoder 312 is also connected to a first input of an AND gate 330, the second input of which is connected to the Y6 output of decoder 312. An output of AND gate 330 is connected to an enable input $\overline{E}$ of decoder 302.

The SHIFT and SHLAB signals enable data stored in accumulator 201 to be shifted to the right or left as described in greater detail below with reference to TABLES E and F.

The ALUB signal controls arithmetic operations in ALU 204 and storage of the results of the operations in accumulator 201.

The SET SGN and CLR SGN signals from AND gates 316 and 318 respectively, cause the most significant bit of data stored in accumulator 201 to be set to a "1" or "0" respectively. For example, pursuant to steps 1 and 3 shown in FIG. 6, an incoming signal is required to be rectified, and in step 14A the control word is required to be set to a positive value. These two requirements are fulfilled by generating and applying the SET SGN signal to accumulator 201. Also, in step 14B, it is required to negate the control signal stored in flip-flop 216. This is accomplished by generating the CLR SGN signal and applying it to accumulator 201, and subsequently loading the SGN signal (i.e. zero) into the data input D of flip-flop 216.

Data bits D3, D4 and D5 are connected to control inputs of ALU 204 for selection between adding, subtracting, and stream blanking operations of ALU 204, described in detail below with reference to TABLES C1, C2 and C3.

Least significant data bits D0, D1 and D2 are decoded in decoders 302 and 304 in response to the decoders being enabled. Decoder 302 is enabled in response to receiving a logic low signal from the Y7 output of decoder 312. The decoded outputs Y0-Y5 of decoder 302 are used to selectively enable shift registers 205 through 214, via enable inputs $\overline{E}$ thereof.

Outputs Y6 and Y7 are connected to E1 and E2 inputs of data ROM 306, for selecting between high and low pages of data stored therein.

Decoder 304 is enabled in response to the Y1 output of decoder 312 going low. Data bits D0, D1 and D2 are decoded in decoder 304 to provide enable signals for transmission to shift registers 211, 212 and 214.

Operation of the digital signal processor as a loudspeaking telephone is initiated at the start of each 125 microsecond frame by the frame pulse signal FP, generated by the master clock circuit 404, which causes the CLR input of program counter 414 to go high and the EN output of reset circuit 412 to go low thus clearing counters 408 and 414 and thereby addressing the first memory location of instruction ROM 418.

Serial PCM buffers 200 receive the current line and microphone PCM signal samples, $PCM_i$ and $PCM_o$, and store one time slot of each for the remainder of the 125 microsecond frame, during which time the samples are processed. Following this time slot which, in the successful prototype, was approximately 4 microseconds, instructions in ROM 418 are decoded in decoder 312 such that the signal samples stored in PCM buffers 200 are shifted, suppressed or otherwise arithmetically manipulated.

PCM words are shifted most significant bit first, but ALU 204 is required to be loaded with the least significant bit first. Thus, accumulator 201 is made bidirectional such that words are shifted into the PCM IN input thereof most significant bit first and shifted out the QR output thereof least significant bit first. Similarly, data is shifted into the input IN, least significant bit first and shifted from PCM OUT and QA most significant bit first.

In order to rectify an incoming signal sample stored in accumulator 201, the signal sample is shifted into accumulator 201 and the current instruction data bits D0-D9, generated by ROM 418 are decoded in decoder 312 such that output Y2 goes low, and data bit D5 goes high such that the output of AND gate 318 goes high clearing the most significant bit (sign bit) of the sample stored in accumulator 201 to zero. This corresponds to rectifying the input sample, as described above with reference to FIG. 2.

In order to set or reset control flip-flop 216, as described above, the SGN signal from accumulator 201 is applied to the D input thereof. Data bits D6-D8 are decoded in decoder 312 such that the Y2 output thereof goes low. With data bit D3 at a logic high level, and on a rising edge of clock signal $\theta$, the output of AND gate 440 goes high, latching the value of SGN into control flip-flop 216.

In order to load one of the threshold words $TH_u$, $TH_L$ or $T_u$ into threshold register 209 for subtraction in ALU 204, the data bits D6-D8 generated by instruction ROM 418 are decoded such that output Y3 of decoder 312 goes low, thereby applying the REGLDB signal to the LD input of register 209. In addition, data bits D0-D2 are decoded in decoder 304 such that output Y1 thereof goes low in response to being enabled as a result of outputs Y6 and Y7 of decoder 312 being at high logic levels. As a result, the six least significant data bits, D0 to D5 (corresponding to the threshold word), are loaded into register 209. The threshold word is then subtracted from the difference between the peak and noise values, in ALU 204, and the result is stored in accumulator 201. Next, the value of RAMP stored in register 210 is subtracted from the result in accumulator 201, as discussed with reference to steps 13A and B in the flowchart.

In the event that the result of a subtraction in ALU 204 is negative, the SGN output of accumulator 201 goes high, providing the "condition" for a conditional jump to AND gate 428, (FIG. 4). Data bits D6, D7 and D8 from instruction ROM 418 are decoded in decoder 420 such that output Y2 goes low, and program counter 414 is loaded with a predetermined jump address.

In steps 9A and 9B described with reference to FIG. 6 and FIG. 2, RAMP register 210 is loaded with the values $8(P_u-N_u)$ and $16(P_L-N_L)$, respectively. Multiplication by 8 is performed in accumulator 201 by shifting the $(P_u-N_u)$ value three bits to the left, and multiplication by 16 is performed by shifting four bits to the left.

Signal samples stored in predetermined ones of the shift registers 205-214 can be shifted out from the SO output thereof and fed back to the SI input thereof via transmission gate 308 in response to receiving a logic low enable signal from an AND gate 332. A first input of AND gate 332 is connected to the D5 output of ROM 418, the second input of which is connected to an output of NAND gate 334. Two inputs of NAND gate 334 are connected to the D3 and D4 outputs of instruction ROM 418. A selected one of registers 205-214 receives signal samples on the corresponding SI input thereof, via one of transmission gates 308 or 310 in response to predetermined values of data bits D3, D4 and D5 applied to AND gate 332 and NAND gate 334, as described in greater detail below with reference to description of the ARITHMETIC instructions.

As discussed above, data bits D0–D9 generated by instruction ROM 418 are decoded to provide the aforementioned JUMP, INCDEC, ARITHMETIC, SHIFT LEFT, SHIFT RIGHT, REGISTER LOAD and ACCUMULATOR CONTROL instructions for performing the various operations described with reference to the flowchart in FIG. 6.

Each of the instructions has a variety of forms, depending upon specific values of data bits D0–D9.

The JUMP instructions generate signals which ultimately result in the output of AND gate 438 going low, causing data bits D0–D5 of instruction ROM 418 to be loaded into the program counter 414. The various JUMP instructions generated in response to decoding data bits D0–D9, are illustrated in TABLE A.

TABLE A

| D9 | D8 | D7 | D6 | D5D4D3D2D1D0 | Description |
|---|---|---|---|---|---|
| 1 | 0 | 0 | 0 | JUMP ADDRESS | unconditional jump address |
| 1 | 0 | 0 | 1 | JUMP ADDRESS | not used |
| 1 | 0 | 1 | 0 | JUMP ADDRESS | jump to address if SGN=1 |
| 1 | 0 | 1 | 1 | JUMP ADDRESS | enable gain control |
| 1 | 1 | 0 | 0 | JUMP ADDRESS | jump to address if FRAME is positive |
| 1 | 1 | 0 | 1 | JUMP ADDRESS | jump to address if JMPSGNL=1 |
| 1 | 1 | 1 | 0 | JUMP ADDRESS | not used |
| 1 | 1 | 1 | 1 | JUMP ADDRESS | not used | where X = don't care

The contents of registers 201–210 are incremented or decremented in response to execution of the INCDEC instruction generated by decoding data bits D0–D9 according to the values shown in TABLE B1 and selecting one of the registers or a high or low page of ROM 306 according to the values shown in TABLE B2, as follows:

TABLE B1

| D9 | D8 | D7 | D6 | D5 | D4 | D3 | Description |
|---|---|---|---|---|---|---|---|
| 0 | 1 | 1 | 1 | X | 0 | 0 | increment selected register by one if SGN=0, else decrement by 8 |
| 0 | 1 | 1 | 1 | X | 0 | 1 | increment selected register by two if SGN=0, else decrement by 8 |
| 0 | 1 | 1 | 1 | 0 | 1 | 0 | increment selectd register by zero if SGN=0, else increment by 1 |
| 0 | 1 | 1 | 1 | 0 | 1 | 1 | always increment by one |
| 0 | 1 | 1 | 1 | 1 | X | 0 | increment selected register by one if SGN=0, else decrement by 8 |
| 0 | 1 | 1 | 1 | 1 | X | 1 | increment selected register by two if SGN=0, else decrement by 8 | where X = don't care

TABLE B2

| D2 | D1 | D0 | Description |
|---|---|---|---|
| 0 | 0 | 0 | select register 210 |
| 0 | 0 | 1 | select register 209 |
| 0 | 1 | 0 | select register 205 |
| 0 | 1 | 1 | select register 206 |
| 1 | 0 | 0 | select register 207 |
| 1 | 0 | 1 | select register 208 |
| 1 | 1 | 0 | select low page of data ROM 306 |
| 1 | 1 | 1 | select high page of data ROM 306 |

Data on the S1 and S2 inputs of ALU 204 can be added together, subtracted, or otherwise arithmetically and logically manipulated in response to generation of the ARITHMETIC instruction, which is generated in response to data bits D3–D9 being decoded as shown in TABLES C1 and C2. Data on the S2 input of ALU 204 is provided from a selected one of registers 205–214. Registers 205–210 as well as data ROM 306 are selected according to the values of D0–D2 shown in TABLE B2 above. Shift registers 211–214 are selected according to the values shown in TABLE C3 below in the event data bit D6 is at a high logic level and bits D7–D9 are at logic low levels, according to Table C2 below.

TABLE C1

| D5 | D4 | D3 | Description |
|---|---|---|---|
| 0 | 0 | 0 | add selected register to accumulator, store in accumulator |
| 0 | 0 | 1 | subtract selected register from accumulator, store in accumulator |
| 0 | 1 | 0 | shift selected register into accumulator |
| 0 | 1 | 1 | shift 2's compliment of selected register into accumulator |
| 1 | 0 | 0 | add selected register to accumulator, store in register and accumulator |
| 1 | 0 | 1 | subtract selected register from accumulator, store in register and accumulator |
| 1 | 1 | 0 | shift accumulator into selected register, save accumulator |
| 1 | 1 | 1 | decrement accumulator |

TABLE C2

| D9 | D8 | D7 | D6 | Description |
|---|---|---|---|---|
| 0 | 1 | 1 | 0 | arithmetic operation on registers 205–210 |
| 0 | 0 | 0 | 1 | arithmetic operations on registers 211–214 |

TABLE C3

| D2 | D1 | D0 | Description |
|---|---|---|---|
| 0 | 0 | 0 | select register 211 |
| 0 | 0 | 1 | select register 212 |
| 0 | 1 | 0 | select register 214 |

PCM values are shifted between accumulator 201 and PCM buffers 200 in response to execution of particular forms of the SHIFT LEFT instruction, as shown below in TABLE D:

TABLE D

| D9 | D8 | D7 | D6 | D5 | D4 | D3 | D2 | Description |
|---|---|---|---|---|---|---|---|---|
| 0 | 1 | 0 | 1 | 1 | 0 | 1 | 0 | shift from accumulator to PCM buffers (speaker channel) |
| 0 | 1 | 0 | 1 | 0 | 0 | 1 | 0 | clear PCM buffers (speaker channel) |
| 0 | 1 | 0 | 1 | 1 | 1 | 1 | 0 | shift from accumulator to PCM buffers (microphone channel) |
| 0 | 1 | 0 | 1 | 0 | 1 | 1 | 0 | clear PCM buffers (microphone channel) |
| 0 | 1 | 0 | 1 | X | 0 | 0 | 0 | shift from PCM buffers (microphone channel) to accumulator |
| 0 | 1 | 0 | 1 | X | 1 | 0 | 0 | shift from PCM buffers (line channel) to accumulator |
| 0 | 1 | 0 | 1 | X | X | X | 1 | shift contents of accumulator one bit left | where X = don't care

DATA stored in accumulator 201 can be conditionally or unconditionally shifted 1, 3 or 5 bits to the right therein in response to execution of the SHIFT RIGHT instruction, as shown below with reference to TABLE E:

TABLE E

| D9 | D8 | D7 | D6 | D5 | D4 | D3 | D2 | Description |
|---|---|---|---|---|---|---|---|---|
| 0 | 1 | 0 | 0 | 0 | 0 | 0 | 1 | shift contents of accumulator 1 bit right |

TABLE E-continued

| D9 | D8 | D7 | D6 | D5 | D4 | D3 | D2 | Description |
|---|---|---|---|---|---|---|---|---|
| 0 | 1 | 0 | 0 | 0 | 0 | 0 | 1 | shift contents of accumulator 3 bits right |
| 0 | 1 | 0 | 0 | 0 | 1 | 0 | 0 | shift contents of accumulator 5 bits right |
| 0 | 1 | 0 | 0 | 1 | 0 | 0 | 1 | shift contents of accumulator 1 bit right, if SGN=1 |
| 0 | 1 | 0 | 0 | 1 | 0 | 1 | 0 | shift contents of accumulator 3 bits right, if SGN=1 |
| 0 | 1 | 0 | 0 | 1 | 1 | 0 | 0 | shift contents of accumulator 5 bits right, if SGN=1 |

Threshold register 209 is loaded with a threshold value defined by data bits D0–D4 in response to data bits D8 and D9 being at logic low levels and data bits D6 and D7 being at logic high levels, (REGISTER LOAD instruction).

The most significant bit of a value stored in accumulator 201 (the sign bit) can be cleared or set, as described above, in response to execution of the ACCUMULATOR CONTROL instruction, as illustrated below with reference to TABLE F:

TABLE F

| D9 | D8 | D7 | D6 | D5 | D4 | D3 | D2 | D1 | D0 | Description |
|---|---|---|---|---|---|---|---|---|---|---|
| 0 | 0 | 1 | 0 | 1 | 0 | 0 | 0 | 0 | 0 | clear sign bit in accumulator |
| 0 | 0 | 1 | 0 | 0 | 1 | 0 | 0 | 0 | 0 | set sign bit in accumulator |
| 0 | 0 | 1 | 0 | 0 | 0 | 1 | 0 | 0 | 0 | latch sign bit into flip-flop 216 |
| 0 | 0 | 1 | 0 | 0 | 0 | 0 | 1 | 0 | 0 | latch sign bit into gain flip-flop 216 |

The circuitry described herein may be used to generate DTMF and ringing tones under control of an external microprocessor, not shown.

The low order page of data ROM 306 (FIG. 3) preferably contains a 32 word sinewave lookup table and the high order page preferably contains a linear-to-$\mu$-law conversion table. Data ROM 306 is addressed by RAMP register 210 in response to being enabled by decoder 302. QA–QF outputs of register 210 provide address values for addressing particular locations in either the high or low pages of data ROM 306. A logic high signal applied to the E1 input of ROM 306 enables the ROM for reading the low page data, and a logic high signal on the E2 input enables ROM 306 for reading the high page data.

DTMF tones are generated by summing two six bit digitized sinewaves and converting the sum to an 8-bit $\mu$-law encoded value. The contents of RAMP register 210, which are applied to address inputs of data ROM 306, are incremented by a tone coefficient value corresponding to a predetermined phase increment for generating a sinewave at a predetermined frequency. In order to generate a dual tone, the contents of register 210 are saved and a second address is loaded in register 210 and subsequently updated by a second tone coefficient value generated by the external microprocessor.

Microphone envelope detect register 205 stores the first value for addressing the ROM table to generate the first sample of the first sinewave at the aforementioned predetermined frequency, and line envelope detect register 206 stores a second value for addressing the ROM 306 to generate the first sample of the second sinewave having higher frequency. Microphone noise detect register 207 is loaded with a first tone coefficient from the external microprocessor. Line noise detect register 208 is loaded with a second tone coefficient in a like manner.

In operation, the contents of register 205 are added to the first tone coefficient stored in register 207. The result of this addition is shifted into register 210 for addressing the data ROM 306, which is enabled in response to a logic high signal applied to the E1 input thereof. The contents of register 210 are then stored in register 205. Data corresponding to the first sample of the first sinewave is then shifted from the S0 output of ROM 306 into the S2 input of ALU 204, and therefrom into accumulator 201. The sample is then shifted from the accumulator 201, through transmission gate 310 into register 214 in response to at least one of data bits D3 or D4 being low and D5 being high.

Next, the contents of register 206 are added to the second tone coefficient stored in register 208. The result of this addition is shifted into register 210 for addressing a second location in the data ROM 306. The contents of register 210 are then stored in register 206.

Data from ROM 306, corresponding to the first sample of the second (higher frequency) sinewave, is shifted therefrom into accumulator 201 and added to the sample stored in register 214. The resulting linear sum is shifted into register 210. Next, the high order page of data stored in ROM 306 is enabled in response to a logic high signal being applied to the E2 input thereof. The sum of the two sinewave samples stored in register 210 is used to address a location in the linear to $\mu$-law conversion table stored in data ROM 306. The converted $\mu$-law sinewave sample from data ROM 306 is then shifted out to PCM buffers 200, via ALU 204 and accumulator 201.

The updated contents of registers 205 and 206 are then added to the tone coefficients stored in registers 207 and 208 as described above and the entire process is repeated.

In a successful prototype of the invention, the most significant 6 bits of the values stored in registers 205 and 206 were used for addressing ROM 306 through register 210. The tone coefficients stored in registers 207 and 208 were required to be 8 bits wide. The resulting DTMF tone was within $+/-1.5\%$ of the desired frequency, and tones having frequencies between 500 Hz and 1633 Hz were generated.

The digital signal processor can also be used as a tone ringer. In a successful embodiment of the invention the tone ringing signal was a square wave, frequency shifted between 500 Hz and 364 Hz at a rate of 16 Hz. The square wave is generated by loading noise detect registers 207 and 208 from the microprocessor with values representing the number of samples in one-half periods of the 500 Hz and 364 Hz square waves. Register 205 is loaded with the contents of register 207 and then used as a down counter. Register 206 contains a value representing the amplitude of the square wave.

In operation, the contents of the "counter" register 205 are decremented in ALU 204 and loaded into accumulator 201 in order to determine whether the sign bit has been set (i.e. whether the contents of the counter register have been decremented to 0). The decremented value is then reloaded into the "counter" register. Next, the contents of register 206, representing the amplitude of the square wave, are loaded into PCM buffers 200 and transmitted to the speaker through codec 12 and amplifier 18 (FIGS. 1A and 1B). The process is repeated until the contents of the counter register 205 reach 0, in response to which the sign bit of the amplitude register 206 is inverted to a negative value reprsenting the amplitude of the other half cycle of the square wave. The counter register 205 is again preloaded with the contents of register 207 and the process is repeated.

As an alternative, the square wave tone ringer amplitude can be made to decay by decrementing the contents of the amplitude register 206 with every repetition of the above described process.

Register 205 is alternately loaded with a first preset value stored in register 207 (corresponding to the 500 Hz frequency) and a smaller preset value (corresponding to the 364 Hz frequency) stored in register 208 at a rate of preferably 16 Hz.

In a successful prototype of the invention the first preset value was 0 B hex, and the second preset value was 08 hex.

Tone ringing signal samples and DTMF signal samples are applied from the counter register 205 or from ROM 306 respectively, to ALU 204 and applied therefrom to accumulator 201 for application to PCM buffers 200. The signal samples are then applied to one of data lines 15 or 17 (FIGS. 1A and 1B) for application to the codec 21 or speaker 19 associated with the local loudspeaking telephone.

Figure 5:
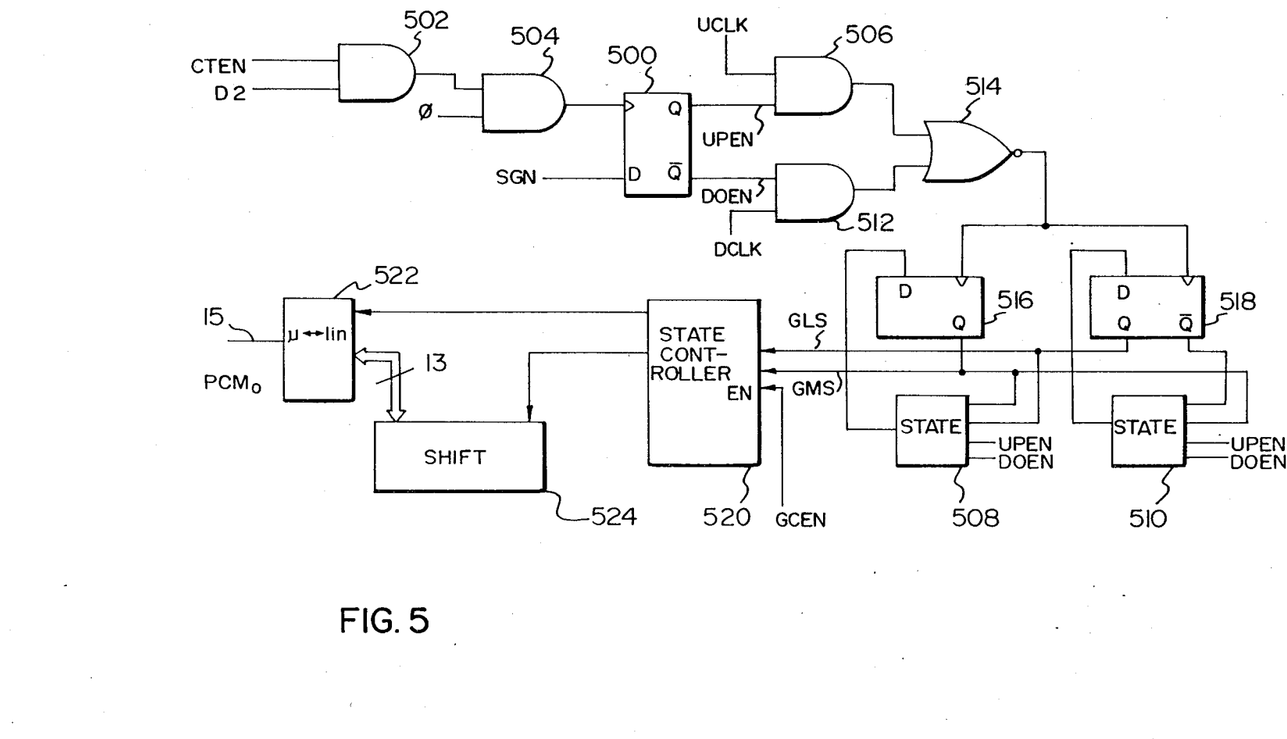
FIG. 5 is a block diagram of a gain control circuit of the present invention.

FIG. 5 is a block schematic illustration of the gain control circuitry 16A discussed above with reference to FIG. 1A. Referring again to the flow chart in FIG. 6, and in particular to step 10, in the event the result of the subtraction $P_u$-$N_u$-$T_u$ is negative, the SGN output of accumulator 201 goes to a logic high level. Consequently, a logic high level signal appears on the D input of a gain control flip-flop 500. Data is clocked into flip-flop 500 in response to the CTEN signal generated by inverter 314 (FIG. 3), the D2 output of instruction ROM 418 and the clock signal $\theta$, each going high. The CTEN signal is applied to a first input of AND gate 502, the second input of which is connected to the D2 output of instruction ROM 418. The output of AND gate 502 is connected to a first input of AND gate 504, a second input of which is connected to clock signal $\theta$. The output of AND gate 504 is connected to the clock input of flip-flop 500.

The Q output of flip-flop 500 goes high in response to the logic high SGN signal being clocked therein. The Q output of flip-flop 500 is connected to a first input of AND gate 506 and first inputs of state feedback circuits 508 and 510, respectively.

The $\overline{Q}$ output of flip-flop 500 is connecte to a first input of AND gate 512, and to second inputs of state feedback circuits 508 and 510 respectively.

Second inputs of AND gates 506 and 512 are connected to up and down clock signal sources UCLK and DCLK respectively. The up and down clock signal sources UCLK and DCLK are not shown, but are well known counter circuits typically connected to RESTART output of master clock circuit 404 (FIG. 4). The UCLK signal source generates a positive clock pulse once every 2048 frames, and the DCLK source generates a clock pulse each 256 frames. Thus, the output of AND gate 506 goes high every 256 milliseconds in the event the SGN output of accumulator 201 is at a logic high level, and the output of AND gate 512 goes to a logic high level every 32 milliseconds in the event the SGN output of accumulator 201 is at a logic low level.

The outputs of AND gates 506 and 512 are connected to first and second inputs of NOR gate 514, the output of which is connected to clock inputs of flip-flops 516 and 518.

The Q output of flip-flop 516, and the $\overline{Q}$ output of flip-flop 518 are connected to third inputs of state feedback circuits 508 and 510 respectively. The Q output of flip-flop 516 is also connected to a fourth input of state feedback circuit 510, and the Q output of flip-flop 518 is connected further to a fourth input of state circuit 508. The outputs of state circuits 508 and 510 are connected to the D inputs of flip-flops 516 and 518 respectively.

The Q outputs of flip-flops 516 and 518 generate enable signals denoted as GMS and GLS respectively, for application to state controller circuit 520. The enable signal GCEN generated by the Y3 output of decoder 420 (FIG. 4) is applied to an enable input EN of state controller circuit 520.

Flip-flops 516 and 518 in conjunction with corresponding state feedback circuits 508 and 510 function as the aforementioned 2 bit up/down gain control counter. Assuming that the flip-flops are initially reset, and gate 506 generates a logic high signal (i.e. the result of the subtraction in step 10 yielded a negative value), the Q output of flip-flop 518 goes to a logic high level (i.e. GLS equals 1), and the Q output of flip-flop 516 remains at a low logic level (i.e. GMS equals 0). In the event 125 milliseconds elapse, and the results of the subtraction in step 10 is still negative, the 2 bit counter circuit is incremented in response AND gate 506 generating a further logic high signal, such that GMS equals 1 and GLS equals 0. However, in the event 32 milliseconds elapses and the subtraction in step 10 yields a positive result, a logic low signal is latched into filp-flop 500, causing AND gate 512 to generate a logic high signal which in turn causes the counter circuit to be decremented.

State feedback circuits 508 and 510 operate to ensure that in the event that both Q outputs of flip-flops 516 and 518 are at logic high levels and gate 506 generates a further logic high signal, the Q outputs of flip-flops 516 and 518 remain the same (i.e. the counter does not "roll over" causing GMS and GLS to become both equal to 0). Likewise, in the event GMS and GLS are each equal to 0 and gate 512 generates a logic high signal, the counter is not further decremented.

PCM signal samples are received from PCM buffers 200 via data line 15 and applied to a $\mu$-law to linear converter 522 under control of state controller circuit 520. The chord and step bits are separated in converter 522, and predetermined ones of the step bits are shifted a predetermined number of bits to the left in order to generate a 13 bit linear signal. The linear signal is added to an offset value (typically 33 decimal) in order to compensate for a zero crossing conversion offset, in a well known manner. The 13 bit linear signal is received from converter 522 by a serial shift circuit 524, for shifting the linear signal sample 1 bit to the right (corresponding to an attenuation of −6 db), or one bit to the left (corresponding to an increase in gain of +6 db).

The shifted linear signal sample is reapplied to converter 522, for reconversion to $\mu$-law encoded PCM format, under control of state controller circuit 520.

Hence, the signal values GMS and GLS are applied to state controller circuit 520 in order that linear signal samples applied to serial shift circuit are shifted 1 bit to the right or left therein.

TABLE G illustrates the values of GMS and GLS, and the corresponding amount of attenuation of the microphone channel signal.

TABLE G

| GMS | GLS | ATTENUATION |
|-----|-----|-------------|
| 0   | 0   | 0db         |
| 0   | 1   | −6db        |
| 1   | 0   | −12db       |
| 1   | 1   | −18db       |

In summary, the invention is a digital loudspeaking telephone employing a digital signal processor. The digital signal processor is capable of implementing various loudspeaking telephone functions; such as channel switching, automatic gain control, echo cancellation, ringing tone and DTMF tone generation. In the preferred embodiment of the invention an incoming signal from a remote party is suppressed while the local subscriber is speaking, and outgoing signal samples received by the microphone are gain adjusted for transmission to the remote party while he is speaking. In the event both parties are talking simultaneously, the channel which was previously in control maintains control, such that no spurious switching occurs.

Persons skilled in the art understanding this invention may now conceive of other embodiments or variations, using the principles described herein.

For example, any suitable digital signal processor may be used, or the incoming and outgoing signals can be digitally compressed (i.e. by shifting PCM chord bits a predetermined number of bits to the right), as opposed to being suppressed (i.e. generating quiet code).

Also, whereas codecs 12 in FIG. 1A, and 21 in FIG. 1B were described for performing analog-to-digital and digital-to-analog conversion of audio PCM signal, any suitable A/D or D/A system may be utilized.

All these and other variations are considered to be within the sphere and scope of this invention, as defined in the claims appended hereto.

We claim:

1. A digital loudspeaking telephone for connection to incoming and outgoing unidirectional data lines carrying incoming and outgoing digital signals respectively, comprising:
   (a) a microphone for transmitting an outgoing analog signal,
   (b) a speaker for receiving an incoming analog signal,
   (c) a codec connected to the microphone and speaker for receiving the outgoing analog signal and generating said outgoing digital signal in response thereto, and for receiving said incoming digital signal and generating the incoming analog signal in response thereto, and
   (d) a digital signal processor comprised of:
      (i) means for detecting incoming and outgoing envelopes of said incoming and outgoing digital signals, and generating incoming and outgoing digital envelope signals in response thereto,
      (ii) means for detecting incoming and outgoing noise levels of said incoming and outgoing digital signals, and generating incoming and outgoing digital noise floor signals in response thereto,
      (iii) means for detecting the amount of echo signal in a predetermined one of said incoming or outgoing signals and generating a digital ramp signal indicative thereof, in response thereto,
      (iv) means for generating incoming and outgoing digital threshold signals,
      (v) means for detecting which of said incoming and outgoing digital signals has been previously suppressed relative to the other and in the event the incoming digital signal has been previously suppressed comparing said outgoing envelope signals with said outgoing noise floor signal and either selecting (A) in the event said outgoing envelope signal is greater than said outgoing noise floor signal or else selecting (B), in which
         (A) is a step comprised of suppressing said incoming digital signal,
         (B) is a step comprised of summing said incoming noise floor signal, said incoming threshold signal and said ramp signal and generating a first sum signal in response thereto, and comparing said incoming envelope signal with said sum signal and either suppressing said incoming digital signal in the event said incoming envelope signal is less than said sum signal or selecting (C), in which
         (C) is a step comprised of suppressing said outgoing digital signal,
      and in the event the outgoing digital signal has been previously suppressed, comparing said incoming envelope signal with said incoming noise floor signal and either suppressing said outgoing digital signal in the event said incoming envelope signal is greater than said incoming noise floor signal or selecting (D), in which
         (D) is a step comprised of summing said outgoing noise floor signal, said outgoing threshold signal and said ramp signal and generating a second sum signal in response thereto, and comparing said outgoing envelope signal with said second sum signal and either selecting (C) in the event said outgoing envelope signal is less than said second sum signal, or else selecting (A).

2. A digital loudspeaking telephone as defined in claim 1, wherein said digital signal processor is further comprised of:
   (a) timing and control circuitry for generating control signals, and
   (b) data storage and manipulation circuitry connected to said timing and control circuitry and said incoming and outgoing data lines, comprised of means for receiving said control signals and said incoming and outgoing digital signals, generating and storing said envelope signals, noise floor signals, ramp signals and threshold signals, generating said sum signals and suppressing said incoming and outgoing signals in response to receiving said control signals.

3. A digital loudspeaking telephone as defined in claim 2, wherein said data storage and manipulation circuitry is further comprised of:
   (a) a plurality of shift registers for storing said envelope signals, noise floor signals, ramp signals and threshold signals,
   (b) an arithmetic logic unit connected to said shift registers for generating said sum signals in response to receiving first predetermined ones of said control signals from said timing and control circuitry,
   (c) a plurality of decoder circuits connected to said shift registers, for enabling predetermined ones of said shift registers in response to receiving second predetermined ones of said control signals from said timing and control circuitry, and
   (d) buffer circuitry connected to said incoming and outgoing data lines, for temporarily storing said incoming and outgoing digital signals, and suppressing one of said incoming or outgoing signals in response to receiving third predetermined ones of said control signals from said timing and control circuitry.

4. A digital loudspeaking telephone as defined in claim 3, wherein said timing and control circuitry is comprised of:
   (a) a clock circuit for generating synchronizing clock signals,
   (b) a first counter connected to said clock circuit for receiving said clock signals and further predetermined ones of said control signals, and generating count signals in response thereto,
   (c) a reset circuit connected to said counter for receiving said count signals, and generating count enable signals in response thereto,
   (d) a program counter connected to said reset circuit, for receiving said count enable signals, and generating program count signals in response thereto, and
   (e) a memory circuit connected to said program counter, for receiving said program count signals and generating said control signals in response thereto.

5. A digital loudspeaking telephone as defined in claim 2, wherein said digital signal processor means further includes tone generator means for receiving additional control signals, and in response generating one of either ringing or dialling tones for transmission to said outgoing data line.

6. In a loudspeaking telephone, a method of suppressing one or another of an incoming and an outgoing signal on incoming and outgoing lines, respectively, comprising the steps of:
   (a) receiving and detecting the relative magnitudes of said incoming and outgoing signals and generating incoming and outgoing envelope signal samples in response thereto;
   (b) detecting incoming and outgoing noise floor levels of said incoming and outgoing signals and generating incoming and outgoing noise floor signal samples in response thereto;
   (c) generating incoming and outgoing predetermined threshold signal samples;
   (d) detecting which of a previous one of said incoming or outgoing signals has been suppressed relative to the other;
   (e) in the event the previous outgoing signal was suppressed comparing the incoming noise floor signal sample to the incoming envelope signal sample, and in the event said incoming envelope signal sample is greater than said incoming noise floor sample, generating a ramp signal representative of an echo signal of said incoming signal appearing in said outgoing signal, and suppressing said outgoing signal; and in the event said incoming envelope signal sample is less than said incoming noise floor signal sample, summing said outgoing noise floor signal sample with said ramp signal and said outgoing predetermined threshold signal sample and in response generating a first sum signal sample, comparing said outgoing envelope signal sample with said first sum signal sample, and suppressing said outgoing signal in the event said outgoing envelope signal sample is less than said first sum signal sample, and suppressing said incoming signal in the event said outgoing envelope signal sample is greater than said first sum signal sample; and
   (f) in the event the previous incoming signal was suppressed comparing the outgoing noise floor signal sample to the outgoing envelope signal sample and in the event said outgoing envelope signal sample is greater than said outgoing noise floor signal sample, generating a further ramp signal sample representative of an echo signal of said outgoing signal appearing in said incoming signal, and suppressing said incoming signal; and in the event said outgoing envelope signnal sample is less than said outgoing noise floor signal sample, summing said incoming noise floor signal sample with said further ramp signal sample and said incoming predetermined threshold signal sample and in response, generating a further sum signal sample, comparing said incoming envelope signal sample with said further sum signal sample, and suppressing said incoming signal in the event said incoming envelope signal sample is less than said further sum signal sample, and suppressing said outgoing signal in the event said incoming envelope signal sample is greater than said further sum signal sample.

* * * * *